Patented Aug. 24, 1943

2,327,397

UNITED STATES PATENT OFFICE 2,327,397

PROCESS FOR MAKING ESTERS OF HYDROXYALKYL CELLULOSES AND PRODUCT PRODUCED THEREBY

Aubrey E. Broderick, South Charleston, W. Va., assignor to Carbide and Carbon Chemicals Corporation, a corporation of New York No Drawing. Application November 18, 1939, Serial No. 305,104

16 Claims. (Cl. 260—226)

The present invention relates to the production of secondary cellulose esters, such as the partially hydrolyzed or alcoholized cellulose esters of the aliphatic acids; and more especially it concerns a novel method for the partial hydroysis or alcoholysis of primary esters of hydroxyalkyl celluloses of the fibrous type. It has especial utility for the production, from cotton linters and high grade wood pulp, of acetone-soluble partially hydrolyzed hydroxyalkyl cellulose esters that are eminently adapted for the manufacture of films, and filaments of extremely high quality.

The invention has especial utility for the partial hydrolysis of primary esters produced in the fibrous form by any of the usual non-solvent esterification procedures. Heretofore no satisfactory method for the hydrolysis of the fibrous type of cellulose esters has been available, other than that which involves dissolving the ester in acetic acid and conducting the hydrolysis in the presence of a large volume of that acid, after which the hydrolyzed product is precipitated from the solution by means of water. In such prior processes, a large amount of acetic acid must be recovered from this dilute aqueous solution by a relatively costly combined extraction-distillation procedure. The hydrolyzed product must be heat-stabilized by boiling with dilute sulfuric acid or by an equivalent treatment.

Among the more important objects of the present invention are the following: To provide for partially hydrolyzing primary esters of hydroxyalkyl celluloses existing in the fibrous form, as produced by esterification procedures of the non-solvent type; to provide for partially hydrolyzing or alchoholizing a primary ester of an hydroxyalkyl cellulose while the latter is in solution in inexpensive solvents readily recoverable by direct distillation; to provide in novel manner for making acetone-soluble esters of hydroxyalkyl celluloses; to provide for partially hydrolyzing a primary ester of an hydroxyalkyl cellulose under conditions whereby stabilization of the hydrolyzed product concurrently is effected; to provide a novel process for partially hydrolyzing such primary esters to a satisfactory degree in a small portion of the time required by prior processes for ester hydrolysis in acetic acid solutions; to provide for partially hydrolyzing such primary esters in the absence of other than very small amounts of ethyl acetate, which is formed during certain "dope" esterification processes conducted in the presence of large volumes of acetic acid and ethyl or methyl alcohol; to provide for the production of partially hydrolyzed hydroxyalkyl cellulose esters capable of conversion to films and filaments having greater tensile strengths, bursting strengths, and higher elongations and greater affinities for direct dyestuffs than products produced by prior processes; and forming films and filaments carrying lower electrostatic charges than such prior products. These and other objects will be apparent from the following description.

According to one modification of the invention, a primary ester of an hydroxyalkyl cellulose is partially hydrolyzed or partially alcoholized while dissolved in a solvent—preferably a mixture of a monohydric aliphatic alcohol having from one to five carbon atoms, and a chlorinated hydrocarbon. The hydrolysis may be conducted in the presence of a catalyst for the hydrolysis, such as dilute sulfuric or other suitable mineral acid, though a catalyst is unnecessary, and is generally undesirable when an acetone-soluble ester is desired. Among primary cellulose esters effectively converted to valuable secondary esters by the present invention may be mentioned such primary esters of hydroxyalkyl celluloses as the primary hydroxyethyl cellulose acetates, hydroxypropyl cellulose acetates, and hydroxyethyl or hydroxypropyl cellulose acetate-butyrates.

Suitable chlorinated solvents include the dichlorides of ethylene, methylene and propylene; chloroform; and tetrachlorethane—the alkylene dichlorides being especially efficacious in conjunction with the lower alcohols. In certain instances a single solvent for the primary ester—such as dioxane—may less effectively be used, particularly when an acetone-soluble product is not required, and an hydrolysis catalyst may be used.

In general, in the practice of the invention, a fibrous type of primary ester of a cellulose ether is dissolved in a solvent therefor, such as a mixture of a chlorinated solvent and a lower aliphatic alcohol, while heating to a temperature around 50° C. to 75° C. until a homogeneous mobile solution is secured. In the case of the mixed esters, such as the hydroxyalkyl cellulose acetate-butyrates, heating usually is not necessary to effect the solution. The ratio of the chlorinated solvent to alcohol in the solvent mixture may range between about 95:5 and 50:50. A ratio of 70:30 is particularly advantageous.

To the solution thus obtained may be added water and/or a solvent for the hydrolysis mixture, such as a lower alcohol or the equivalent, with or without an hydrolysis catalyst; and the mixture is rapidly stirred at the temperature at which the partial hydrolysis is to be effected. Preferably the amount of water present, when used, should not exceed that compatible with this mixture, since otherwise the rate of hydrolysis is greatly reduced. The added solvent prevents local precipitation of the primary ester, and facilitates rapid dispersion of the water in the solution.

Among suitable hydrolysis catalysts may be mentioned mineral acids such as sulfuric, hydrochloric, phosphoric, and perchloric acids.

The partial hydrolysis of the primary ester may be conducted at temperatures within the range between about 0° C. and about 100° C., depending upon such factors as the desired degree of hydrolysis, the time of reaction, and the presence or absence of a catalyst. From practical considerations, a temperature within the range between 55° C. and 75° C. is preferred when using a catalyst. When using temperatures above the boiling point of the solvent or mixture, the hydrolysis is conducted under pressure in an autoclave.

Hydrolysis in the absence of an added catalyst requires a somewhat higher temperature and a longer period for the reaction. Surprisingly, the product from the uncatalyzed hydrolysis reaction possesses excellent acetone solubility, even when the combined acetic acid content is less than 50%. These acetone solutions are convertible to films having elongations much greater than films of commercial rayon grades of cellulose acetate. Moreover, where a relatively small amount of water is used in the hydrolysis, the resultant dope is directly convertible to films and filaments without intermediate steps of precipitation, washing and drying, and recovery of the solvent used in the hydrolysis.

The partial alcoholysis of a primary cellulose ester is conducted in manner similar to the hydrolysis, excepting that water is excluded as far as possible; the alcoholysis proceeds more slowly; and the resultant products are not the equal in quality of the partially hydrolyzed esters. Methanol and ethanol serve effectively for the alcoholysis.

After the desired degree of hydrolysis or alcoholysis has been attained, the ester may be separated from the solvent mixture by pouring slowly in boiling water, with agitation, at such a rate that the solvents are evaporated practically instantaneously. Alternatively, the hydrolyzed ester may be sprayed into a chamber by means of steam to precipitate the ester and remove the solvent. Purification of the ester may be completed by boiling with successive changes of water, to provide complete heat stability for at least three hours at 180° C. The ester then may be dried at between 60° and 85° C. to a moisture content of around 1% to 2%.

The properties of the partially hydrolyzed hydroxyalkyl cellulose esters thereby produced vary widely, depending upon such factors as the character of the primary ester, the degree of hydrolysis or alcoholysis, and—particularly when the hydrolysis is conducted at temperatures between 75° and 100° C.—whether or not an hydrolysis catalyst was used. Useful secondary hydroxyalkyl cellulose esters and mixed esters of organic acids containing between around 46% and 59% of combined organic acid (calculated as acetic acid) are produced by the process. Thus, partially hydrolyzed hydroxyethyl cellulose acetates having only about 46% of combined acetic acid content (compared with 58%–59% for the primary ester) are convertible to films having elongations 60% to 100% greater than the commercial types of cellulose acetate. The wet strength of the films fall as the acetic acid content of the product declines from 50% to 46%. In the case of the mixed esters, such as the acetobutyrates of hydroxyethyl celluloses, this wet strength declines to a smaller extent as the organic acid content is reduced.

Those partially hydrolyzed hydroxyethyl cellulose acetates containing from around 44% to around 50% of combined acetic acid, and hydrolyzed in the presence of an hydrolysis catalyst, generally are soluble only in a mixture of ethylene dichloride and an alcohol such as methanol and ethanol. They are especially useful in the lamination of glass, due to their exceptionally good adhesive properties; and are convertible to rayon filaments adaptable to orientation through stretching to a far greater extent than commercial types of cellulose acetate.

Hydrolyzed hydroxyethyl cellulose acetates of the invention containing between around 50% and 54% of combined acetic acid have outstanding properties. Films prepared therefrom are superior to those made from commercial cellulose acetate as to both wet and dry tensile strengths, and elongations in both the wet and dry state. Products within this range of acetyl content form good solutions in mixtures of ethylene dichloride and an alcohol. In a mixture of methylene dichloride and alcohol they may vary from viscous solutions to clear gels. Surprisingly, those hydrolyzed at elevated temperatures in the absence of an hydrolysis catalyst have excellent acetone solubility when containing between around 48% and 54% of combined acetic acid.

Hydrolyzed hydroxyethyl cellulose acetates containing from 54% to 59% of combined acetic acid have good solubility in methylene dichloride-alcohol mixtures.

In one modification of the invention, it is preferred to utilize as starting material a fibrous primary ester of an hydroxyalkyl cellulose, substantially free from acetic acid and acetic anhydride, such as produced by the non-solvent type of procedure whereby the fibrous character of the original cellulosic material is preserved in the esterified product. Such an ester may be produced by treating a dry hydroxyethyl cellulose, derived from unmercerized cotton linters, for 3 to 4 hours at room temperature with the requisite amount of acetic anhydride. Then a mixture of isopropyl acetate (or other suitable non-solvent for the cellulose ester) and a sulfuric acid catalyst is added. When acetylation is complete, the fibrous ester is filtered, washed with isopropyl acetate, and separated from the latter by steam distillation or other suitable means. It is then ready for hydrolysis.

The hydroxyalkyl celluloses used in the production of the fibrous primary cellulose esters preferably are made by reacting, at pressures preferably around atmospheric or below, a mixture of an unmercerized cellulose and water with vapors of an alkylene oxide or equivalent hydroxyalkylating agent in amount ranging from around 7.5% to 30% or more of the dry weight of the cellulose, in the presence of an etherification catalyst. Such a process is described in my United States Patent No. 2,173,471, issued September 19, 1939. The fiber structure of the original cellulose is fully preserved.

The hydroxyalkyl celluloses having alkylene oxide contents ranging from around 13% and 20% of the dry weight of the cellulose are especially suitable for use. Those having alkylene oxide contents greatly exceeding 30% yield esters which form films having somewhat lower tensile strengths but very high elongations; while if the alkylene oxide content is much below 13%, difficulties may be encountered in the hydrolysis of the ester formed therefrom by a fibrous esterification process.

The partially hydrolyzed hydroxyalkyl cellulose esters of the present invention differ from commercial types of cellulose acetate in having a much greater affinity for direct dyestuffs than the latter. Films and yarns of the former carry lower electrostatic charges than those made from the latter—and have higher bursting strengths.

The reactions involved in the process appear unlike those occurring in the conventional method of hydrolysis of cellulose esters in acetic acid solution, wherein the hydrolysis proceeds to solubility of the product in acetone at a combined acetic acid content of 53%-60%, and becomes acetone-insoluble beyond these limits. In the present process satisfactory acetone solubility generally is not attained in a practicable manner at any stage of the hydrolysis, excepting when the latter is conducted in the absence of an hydrolysis catalyst, or is conducted at temperatures around 75° to 100° C. in the presence of a small amount of such catalyst.

The hydrolysis step of the invention serves to heat-stabilize the resultant product, in marked contrast to other hydrolysis processes which have yielded products that required boiling in dilute sulfuric acid solutions to impart suitable heat stability thereto. The products of this invention will stand a temperature of 180° C. for 3 hours or longer.

The following will serve to exemplify the invention:

*Example 1*

A mixture of a fibrous primary hydroxyethyl cellulose acetate in anhydrous methanol, and containing 3525 grams of the said ester and 3127 grams of anhydrous methanol, was dissolved in 14,140 c. c. of ethylene dichloride by heating the mixture at between 50° and 60° C. for 2.5 hours. Then a mixture of 786 c. c. of water and 1222 c. c. of methanol was added slowly and the above-mentioned temperature continued for 2 hours. The solution then was heated in a stainless steel container for about 14.5 hours at a temperature around 98°-100° C., after which it was poured slowly into boiling water, thereby distilling off the methanol, ethylene dichloride, and the methyl acetate formed in the hydrolysis. The residual fluffy cellulose ester was purified by boiling with several changes of water. After drying the ester to a moisture content of 1%, it had a combined acetic acid content of 50.8%.

The fibrous primary hydroxyethyl cellulose acetate was prepared by slowly adding 10,680 grams of a mixture containing 15.1% of an hydroxyethyl cellulose, 82.8% of acetic acid and 2.1% of water to an agitated mixture containing 6920 grams of acetic anhydride, 27.7 c. c. of 95% sulfuric acid, and 21,620 grams of isopropyl acetate, while maintaining the mixture at a temperature between 25° and 30° C. The ester was filtered, extracted successively with isopropanol and methanol, and centrifuged to a composition containing 51.5% of the primary hydroxyethyl cellulose acetate and 48.5% methanol.

For the separation of the primary hydroxyethyl cellulose acetate from the reaction mixture, isopropyl ether may be used instead of isopropanol as an extractant. Thereby, solvents such as isopropyl ether, isopropyl acetate, acetic acid and acetic anhydride, which may be present in the resultant extract, are readily isolated and may be recovered by direct distillation. Any remaining isopropyl ether may be removed by steam distillation since it has a very low tolerance for water.

The hydroxyethyl cellulose used in the production of the above-mentioned primary ester was prepared from a commercial grade of cotton linters by mixing 7651 grams of the linters (containing 8.5% of moisture) with a solution of 140 grams of caustic soda in 9849 grams of water. The mixture was placed in a closed container which then was evacuated, and 1153 grams of ethylene oxide vapors were slowly introduced while maintaining the mixture at around 45° C. After a heating period of 14.5 hours, the reaction mixture was dispersed in 20 gallons of water containing 250 grams of acetic acid, was extracted successively with cold and with boiling water, and centrifuged. The resultant hydroxyethyl cellulose was dehydrated by extraction with glacial acetic acid. The dehydration of the hydroxyethyl cellulose may be accomplished without the use of acetic acid. Thus, the former may be dried to 1 to 2% moisture content, and thereafter merely mixed with acetic anhydride prior to the fibrous esterification. Thus the addition of acetic acid is unnecessary at any stage of the esterification of the hydroxyalkyl cellulose.

A dope containing about 20.5% of the ester and 79.5% of acetone was readily converted into filaments or rayon yarn having higher tenacities and elongations, both when wet and when dry, than a commercial grade of cellulose acetate; and which also were superior to the latter in having fusion points 10° to 20° C. higher, greater affinities for dyestuffs, especially direct dyestuffs, greater resistances to flexing, and superior heat-stabilities.

*Example 2*

Following the general procedure described in Example 1, 4596 grams of spruce wood pulp containing about 96% of alpha cellulose (containing 8.8% of moisture) were reacted with 756 grams of ethylene oxide, after disintegration in a 1.4% aqueous solution of caustic soda.

Following the general procedure described in Example 1, 9290 grams of acetic acid-extracted hydroxyethyl cellulose containing 1700 grams of the latter (dry weight) were reacted with 7550 grams of acetic anhydride in the presence of 30 c. c. of 95% sulfuric acid and 22,710 c. c. of isopropyl acetate. The resultant primary ester was separated and hydrolyzed in the general manner described in Example 1, yielding a partially hydrolyzed hydroxyethyl cellulose acetate having a combined acetic acid content of 49.9% after drying to a moisture content of 1%.

This secondary ester was dissolved in acetone and filtered, yielding a spinning composition containing 22.6% of the ester, which was converted to rayon yarns having strengths and elongations superior to those of a commercial cellulose acetate yarn.

*Example 3*

A fibrous primary hydroxyethyl cellulose acetate was prepared by esterifying a dry fibrous hydroxyethyl cellulose with acetic anhydride at room temperature for 3-4 hours, in the presence of a sulfuric acid catalyst and of isopropyl acetate in amount preventing dissolution of the resultant ester. The hydroxyethyl cellulose used was prepared from a purified wood pulp by combining therewith 20% of ethylene oxide in the manner described in my aforesaid copending application, Serial No. 226,428.

Two hundred grams of this fibrous primary acetate of hydroxyethyl cellulose were dissolved in a mixture of 400 c. c. of anhydrous ethanol and 1200 c. c. of ethylene dichloride by stirring and heating at 65° C. for 4 hours. After cooling overnight, the dope was heated to 66° C., and the following mixture rapidly added:

| | |
|---|---|
| 95% sulfuric acid | c. c.__ 40 |
| Distilled water | c. c.__ 44.4 |
| Anhydrous ethanol | c. c.__ 167 |

Heating was continued at 67° C. for 12 hours. Samples taken at 4, 8 and 12 hours, and precipitated, purified, and dried, had good heat stability.

The samples were secured from the hydrolysis solution by pouring the dope slowly into hot water. The solvents distilled off—leaving the ester precipitated in a fluffy condition. The latter was purified by boiling in several changes of hot water. It was then dried at 60° C. for 24 hours; and proved to be stable at 180° C. for at least 3 hours.

The four and eight hour samples had the following properties:

| | Combined acetic acid | Solubility (20 g. in 80 c. c.)—ethylene dichloride+methanol (70:30 by vol.) |
|---|---|---|
| | Per cent | |
| Original ester | 58 | |
| 4 hour sample | 53 | Good. |
| 8 hour sample | 50 | Do. |
| 12 hour sample | 46 | Do. |

Films prepared from the ethylene dichloride+methanol solution showed exceptionally high elongation.

*Example 4*

Two hundred grams of the primary acetate of hydroxy-ethyl cellulose, prepared as described in Example 3, were dissolved in 1600 c. c. of the mixture of solvents recited in that example, by heating at 65° C. for 6 to 7 hours. After allowing to cool overnight, the solution was reheated to 65° C. and the following mixture was quickly added:

| | |
|---|---|
| 95% sulfuric acid | c. c.__ 2 |
| Anhydrous ethanol | c. c.__ 214 |

The temperature of about 67° C. was maintained for 12.5 hours, and samples were removed at 4.5, 8.5 and 12.5 hours and purified, and dried, as described in Example 3. Each sample had good heat stability, and the following characteristics:

| Combined acetic acid (per cent) | Solubility (20 g. in 80 c. c.) | | Acetone |
|---|---|---|---|
| | (A) Ethylene dichloride +methanol (70:30 by vol.) | (B) Methylene dichloride +methanol (90:10 by vol.) | |
| 4.5 hr. sample____55.6 | Good | Good | Partly sol. |
| 8.5 hr. sample____54.3 | ____do____ | ____do____ | Do. |
| 12.5 hr. sample____52.6 | ____do____ | ____do____ | Do. |

Solutions A and B provide fibers of good tensile strength and elongation, the elongation increasing progressively as the combined acetic acid content is decreased.

*Example 5*

One hundred and twenty-five grams of a fibrous primary acetate of hydroxyethyl cellulose—prepared by the non-solvent esterification of an hydroxyethyl cellulose, (made from unmercerized cotton linters and containing 16.5% of combined ethylene oxide), were dissolved in a mixture of 100 c. c. of methanol and 350 c. c. of ethylene dichloride by heating to around 60° C. and stirring for four hours. There then was added a mixture of 5 c. c. of water and 45 c. c. of methanol and the said temperature was maintained for an hour. The solution then was heated at 98° C. for 24 hours in a bomb, and a constant pressure of approximately 35 pounds per square inch developed. The resultant dope was directly convertible to clear films of good mechanical properties and heat stability, and having elongations that were greater, both dry and wet, than films from commercial acetone-soluble cellulose acetate commonly used in spinning. Solutions of the esters in acetone, and in ethylene dichloride-methanol mixtures are eminently suitable for conversion to rayon yarn. The precipitated dry hydrolyzed product contained 53.9% of combined acetic acid.

*Example 6*

A homogeneous dope or solution was prepared by dissolving 120 grams of a fibrous primary hydroxyethyl cellulose acetate-butyrate in a mixture of 120 c.c. of anhydrous ethanol and 360 c.c. of ethylene dichloride while heating at around 65° C. with stirring for 2 hours. The said ester was prepared by esterifying a fibrous hydroxyethyl cellulose (derived from unmercerized cotton linters, and containing 16.5% of combined ethylene oxide), utilizing a non-solvent procedure involving the use as non-solvents of isopropyl acetate, together with an ether such as diethyl ether or isopropyl ether, and following the general procedure hereinbefore mentioned whereby the fibrous structure of the original cellulose was retained.

To the aforesaid solution there was slowly added a mixture of:

| | |
|---|---|
| Water | c.c.__ 26.6 |
| 37% hydrochloric acid | c.c.__ 2.4 |
| Anhydrous ethanol | c.c.__ 90.0 |

The resultant mixture was heated at from 65° to 68° C. for 12 hours. The hydrolyzed ester was precipitated, purified and dried in the manner described in Example 3.

Films made from an ethylene dichloride-ethanol (75:25 by volume) solution of the hydrolyzed ester had excellent tensile strengths, especially when wet; and had elongations about 30% higher than films from a rayon grade of commercial cellulose acetate, and about 40% higher than those made from the original primary ester.

*Example 7*

2822 grams of a primary hydroxypropyl cellulose acetate-butyrate, prepared from unmercerized cotton linters with 21.7% of propylene oxide, were dissolved in a mixture of 3520 cc. of anhydrous ethanol and 10,560 c.c. of ethylene dichloride in a stainless steel jacketed mixer, while stirring and heating at 60°–65° C. for about 4 hours. To this hot solution the following mixture was added, while maintaining a temperature of 67° C. for 12 hours:

| | |
|---|---|
| Water _____c.c__ | 629 |
| Anhydrous ethanol _____c.c__ | 2365 |
| 95% sulfuric acid _____c.c__ | 56.6 |

The solution was diluted with cold acetone and cooled to around 0° C. to arrest the reaction. The hydrolyzed ester was then precipitated, purified, and dried in the manner described in Example 3. The combined organic acid content of the hydrolyzed ester was 46.6%, calculated as acetic acid, as compared to a value of 58.2% for the original ester. The product had excellent heat stability. Solutions of the dried ester in a mixture of ethylene dichloride and methanol (70:30 by volume) yielded films having good tensile strength, and exceptionally good elongations 35% greater when dry and 50% greater when wet than films of commercial acetone-soluble cellulose acetate commonly used for conversion to rayon yarn. Highly concentrated dopes were converted to rayon yarn of excellent quality.

*Example 8*

Following the general procedure described in Example 5, 125 grams of the fibrous primary ester recited in that example were dissolved in 757 c.c. of anhydrous dioxane by stirring and heating at 60°–75° C. for 4 hours. After cooling overnight it was reheated to 60° C. and the following mixture added:

| | |
|---|---|
| Dioxane _____c.c__ | 104 |
| Water _____c.c__ | 27.8 |
| 95% sulfuric acid _____c.c__ | 2.5 | and the solution heated for 10 hours at 60°–65° C.

The resultant product had good solubility in an ethylene dichloride-ethanol mixture (70:30 by vol.); and had a combined acetic acid content of 46.5%.

*Example 9*

Utilizing the primary ester recited in Example 8, and following the general procedure described in that example, but utilizing a mixture of chloroform and anhydrous methanol in place of dioxane, generally similar results were secured.

*Example 10*

Following the general procedure described in Example 8, 125 grams of the fibrous primary ester recited in that example were dissolved in a mixture of 568 c.c. of methylene dichloride and 189 c.c. of anhydrous methanol at 20°–30° C. Then the mixture was heated to 40° C., and the following mixture added:

| | |
|---|---|
| Water _____c.c__ | 27.8 |
| Methanol _____c.c__ | 104 |
| 95% sulfuric acid _____c.c__ | 2.5 |

After heating for 12 hours at this temperature, the product was precipitated, purified and dried as described in Example 3.

The hydrolyzed ester had good solubility in a solution of ethylene dichloric-methanol (70:30 by vol.); and had a combined acetic acid content of 56.1%.

*Example 11*

Following the general procedure recited in Example 5, 125 grams of the primary ester described in that example were dissolved in a mixture of 189 c.c. of 88% isopropanol and 568 c.c. of ethylene dichloride, while heating at 60°–70° C. To this mixture, while hot, were added:

| | |
|---|---|
| 99% isopropanol _____c.c__ | 122.4 |
| Water _____c.c__ | 8.4 |
| 95% sulfuric acid _____c.c__ | 2.5 | and the mass heated for 13 hours at 60° C. The resultant product after recovery and purification had good solubility in an ethylene dichloride-methanol (70:30 by vol.) solution; and had a combined acetic acid content of 53%, compared with a corresponding content of 57.9% for the primary ester.

*Example 12*

A fibrous primary hydroxyethyl cellulose acetate was prepared from a viscose rayon grade of sulfite wood pulp by reacting the latter with 20% its weight of ethylene oxide, and acetylating the resultant hydroxyethyl cellulose by the non-solvent or fibrous method. To 406 grams of this ester, wet with 409 grams of methanol, were added 1624 grams of ethylene dichloride, and the mixture was heated with agitation at 60° C. until solution occurred. Then while continuing the heating, an hydrolysis mixture of 91 c. c. of water, 116 c. c. of methanol and 0.5 c. c. of sulfuric acid was gradually added. The resultant mixture was heated in an autoclave to 98°–100° C., which was reached in 4 hours. Heating at this temperature was continued for 7 hours. A satisfactory acetone-soluble product having a combined acetic acid content of 53% was secured upon heating for from 2 to 5 hours. In a run using no hydrolysis catalyst but otherwise identical with this one, a period of from 10 to 13 hours was required to produce a product having this acetic acid content and suitable acetone solubility; and the rate of hydrolysis in the stage in which an acetone-soluble product is formed was between one-third and one-fourth that secured in the catalyzed hydrolysis. For practical reasons, when producing an acetone-soluble ester, it is highly desirable to employ the slower rates of hydrolysis secured in an uncatalyzed reaction.

The term "ester" as used in the accompanying claims is intended to include both the simple esters and the mixed esters of the lower saturated and unsaturated aliphatic acids, such as acetic acid, propionic acid and butyric acid, and those of the higher fatty acids, such as stearic acid, oleic acid, and linoleic acid.

The references in the claims to hydrolyzing a fibrous ester in the substantial absence of an hydrolysis catalyst are intended to designate hydrolysis steps wherein no free mineral acid or other hydrolysis catalyst is added to the reactants, or is present at the start of the hydrolysis.

By the practice of the invention, acetone-soluble hydroxyalkyl cellulose acetates may be produced from cotton linters, which esters, upon conversion to rayon yarn, are around 25% superior in tensile strength when wet, and 15% superior in tensile strength when dry, to commercial cellulose acetate yarn now marketed. By selection of suitable spinning conditions, yarns are produced from these esters which have tensile strengths approximately equivalent to those of commercial cellulose acetate rayon yarn, and elongations from 25% to 50% greater than the latter.

The invention is susceptible of modification within the scope of the appended claims.

I claim:

1. Process of producing an ester of an hydroxyalkyl cellulose capable of forming filaments and films having high tensile strengths and high elongations, which comprises dissolving in a solvent therefor a fibrous primary acetate ester of an hydroxyalkyl cellulose derived from an unmercerized cellulose, and substantially free from acetic acid and acetic anhydride, dispersing water in said solution, partially hydrolyzing the ester to the corresponding secondary ester in the presence of said solvent, and separating the hydrolyzed ester from said solvent.

2. Process of producing an ester of an hydroxyalkyl cellulose capable of forming filaments and films having high tensile strengths and high elongations, which comprises dissolving in a solvent a fibrous primary aliphatic monocarboxylic acid ester of an hydroxyalkyl cellulose substantially free from organic acids and organic acid anhydrides, the said solvent comprising a chlorinated hydrocarbon and a monohydric aliphatic alcohol having less than six carbon atoms, partially hydrolyzing said primary ester to the corresponding secondary ester in the presence of said solvent, and thereafter separating the hydrolyzed ester from said solvent.

3. Process of producing an ester of an hydroxyalkyl cellulose capable of forming filaments and films having high tensile strengths and high elongations, which comprises dissolving in a solvent a fibrous primary aliphatic monocarboxylic acid ester of an hydroxyalkyl cellulose, the said solvent comprising a mixture of an alkylene dichloride, and a monohydric aliphatic alcohol having less than six carbon atoms, the alkylene dichloride and the alcohol being present respectively in said mixture in proportions within the range between about 95:5 and about 50:50 by volume, dispersing water in said solution to the corresponding secondary ester, partially hydrolyzing the ester in said solution, and separating the resultant hydrolyzed ester from said solution.

4. Process of producing a partially hydrolyzed ester of an hydroxyalkyl cellulose, which comprises preparing a solution in a mixture of ethylene dichloride and a lower monohydric aliphatic alcohol of a fibrous primary aliphatic monocarboxylic acid ester of an hydroxyalkyl cellulose substantially free from organic acids and organic acid anhydrides, thereafter partially hydrolyzing said primary ester to the corresponding secondary ester in the absence of substantial amounts of free organic acid, and separately recovering the resultant hydrolyzed ester.

5. Process of producing a heat-stable partially hydrolyzed acetate ester of an hydroxyalkyl cellulose, which comprises dissolving, in a mixture of ethylene dichloride and a monohydric aliphatic alcohol containing less than six carbon atoms, a fibrous primary acetate ester of an hydroxyalkyl cellulose substantially free from acetic acid and acetic anhydride, thereafter partially hydrolyzing said primary ester to the corresponding secondary ester in the absence of substantial amounts of free acetic acid, and separately recovering the resultant hydrolyzed ester.

6. Process of preparing a heat-stable acetone-soluble hydrolyzed ester of an hydroxyalkyl cellulose directly convertible to filaments and films, which comprises heating and partially hydrolyzing a fibrous primary aliphatic monocarboxylic acid ester of an hydroxyalkyl cellulose to the corresponding secondary ester, in the substantial absence of an hydrolysis catalyst and of aliphatic acids and their anhydrides; the said primary ester being produced by the esterification, in the presence of a non-solvent for the ester, of an hydroxyalkyl cellulose derived from an unmercerized cellulose.

7. In the process of preparing a heat-stable ester of an hydroxyalkyl cellulose, the steps which comprise partially hydrolyzing to the corresponding secondary ester a fibrous primary aliphatic monocarboxylic acid ester of an hydroxyalkyl cellulose, derived from an hydroxyalkyl cellulose having an alkylene oxide content within the range from around 7% to around 30%, and formed by the treatment of an unmercerized cellulose with at least one alkylene oxide vapor, the said primary ester during said hydrolysis being substantially free from aliphatic acids and their anhydrides, and being in solution in a solvent mixture of a chlorinated hydrocarbon and a monohydric aliphatic alcohol having less than six carbon atoms, and separately recovering from the reaction mixture the heat-stable hydrolyzed ester thus produced.

8. Process for producing an aliphatic acid ester of an hydroxyalkyl cellulose capable of forming filaments and films having high tensile strengths and high elongations, which comprises esterifying a fibrous hydroxyalkyl cellulose with at least one aliphatic monocarboxylic acid anhydride in the presence of a volatile liquid diluent which is a non-solvent for the resultant primary ester and is present in amount rendering such primary ester insoluble in the esterification mixture, separating free aliphatic acid anhydride, free aliphatic acid and diluent from the said undissolved primary ester, dissolving the ester in a volatile organic solvent for said ester, dispersing water in the resultant solution, partially hydrolyzing the ester to the corresponding secondary ester in the presence of said solvent, and separating the hydrolyzed ester from said solvent.

9. Process for producing an acetone-soluble ester of an hydroxyalkyl cellulose capable of forming filaments and films having high tensile strengths and high elongations, which comprises reacting an hydroxyalkyl cellulose, derived from an unmercerized cellulose, with at least one aliphatic monocarboxylic acid anhydride, in the presence of an esterification catalyst and of a volatile organic liquid diluent which is a non-solvent for the fibrous primary ester thus produced, extracting free aliphatic acid and aliphatic acid anhydride from the fibrous primary ester thus produced, dissolving said fibrous primary ester in a solvent essentially comprising a mixture of a chlorinated hydrocarbon and a monohydric saturated aliphatic alcohol having less than six carbon atoms, partially hydrolyzing said primary ester to the corresponding secondary ester in the presence of said solvent, and in the substantial absence of an hydrolysis catalyst, and separately recovering the acetone-soluble hydrolyzed ester thus produced.

10. Process for producing an acetone-soluble aliphatic acid ester of an hydroxyalkyl cellulose capable of forming filaments and films having high tensile strengths and high elongations, which comprises reacting with at least one aliphatic monocarboxylic acid anhydride upon an hydroxyalkyl cellulose prepared by the reaction of an alkylene oxide upon an unmercerized cellulose, in the presence of an esterification catalyst and of a volatile organic liquid in which the fibrous primary ester thus produced is insoluble, removing from said primary ester excess acid anhydride and aliphatic acid, dissolving the residual fibrous primary ester in a volatile solvent essentially comprising a mixture of a chlorinated hydrocarbon and a monohydric saturated aliphatic alcohol having less than six carbon atoms, partially hydrolyzing said primary ester to the corresponding secondary ester in the presence of said solvent, at a temperature within the range from around 75° to around 100° C., and separately recovering the acetone-soluble hydrolyzed ester thus produced.

11. Process for preparing an aliphatic acid ester of an hydroxyalkyl cellulose, which comprises esterifying an hydroxyalkyl cellulose with at least one aliphatic monocarboxylic acid anhydride in the presence of a volatile liquid diluent which is a non-solvent for the resultant primary ester and is present in amount rendering such ester insoluble in the esterification mixture, extracting free aliphatic acid anhydride and free aliphatic acid from the primary ester thus produced, dissolving the residual primary ester in a solvent comprising a mixture of a monohydric aliphatic alcohol having less than six carbon atoms and a chlorinated aliphatic hydrocarbon, dispersing water in said solution, partially hydrolyzing the said ester to the corresponding secondary ester while in said solution, and recovering the resultant hydrolyzed ester from the reaction mixture.

12. Process for preparing an aliphatic acid ester of an hydroxyalkyl cellulose, which comprises esterifying an hydroxyalkyl cellulose with at least one aliphatic monocarboxylic acid anhydride in the presence of a volatile organic liquid diluent which is a non-solvent for the resultant primary ester and is present in amount sufficient to render such ester insoluble in the esterification mixture, extracting free aliphatic acid anhydride and free aliphatic acid from the primary ester thus produced, dissolving the residual primary ester in a solvent comprising a mixture of a monohydric aliphatic alcohol having less than six carbon atoms and an alkylene dichloride, dispersing water in said solution, hydrolyzing the said ester in said solution to a combined aliphatic acid content, calculated as acetic acid, within the range between about 46% and about 59%, and recovering the resultant hydrolyzed ester from the reaction mixture.

13. Process for preparing an aliphatic acid ester of an hydroxyalkyl cellulose, which comprises esterifying with at least one aliphatic monocarboxylic acid anhydride, a fibrous hydroxyalkyl cellulose containing between 7% and around 30% of combined alkylene oxide and derived from an unmercerized cellulose, in the presence of a volatile liquid diluent which is a non-solvent for the resultant primary ester and is present in amount substantially preventing solution of the primary ester in the esterification mixture, removing free aliphatic acid anhydride and free aliphatic acid from the primary ester thus produced, dissolving the residual primary ester in a solvent comprising a mixture of a monohydric aliphatic alcohol having less than six carbon atoms, a chlorinated hydrocarbon and water, hydrolyzing the said ester while in said solution to a combined aliphatic acid content, calculated as acetic acid, within the range between about 46% and about 59% and recovering the resultant hydrolyzed ester from the reaction mixture.

14. A composition of matter comprising an acetone-soluble aliphatic monocarboxylic acid ester of an hydroxyalkyl cellulose, said ester being produced by the fibrous esterification, with at least one aliphatic monocarboxylic acid anhydride, of an hydroxyalkyl cellulose derived from an unmercerized cellulose, in the presence of an esterification catalyst and of a volatile liquid diluent in which the resultant primary ester is insoluble, said ester being hydrolyzed to a combined aliphatic acid content, calculated as acetic acid, within the range between approximately 48% and 54%.

15. A composition of matter comprising an aliphatic monocarboxylic acid ester of an hydroxyalkyl cellulose, said ester being produced by the fibrous esterification, with at least one aliphatic monocarboxylic acid anhydride, of an hydroxyalkyl cellulose derived from an unmercerized cellulose, in the presence of an esterification catalyst and of a volatile liquid diluent in which the resultant primary ester is insoluble said ester being hydrolyzed to a combined aliphatic acid content, calculated as acetic acid, within the range between approximately 46% and 54%.

16. Process of producing an ester of an hydroxyalkyl cellulose capable of forming filaments and films having high tensile strengths and high elongations, which comprises dissolving in a solvent therefor a fibrous primary aliphatic monocarboxylic acid ester of an hydroxyalkyl cellulose derived from an unmercerized cellulose, and substantially free from organic acids and organic acid anhydrides, dispersing water in the resultant solution, partially hydrolyzing the ester to the corresponding secondary ester in the presence of said solvent, and separating the hydrolyzed ester from said solvent.

AUBREY E. BRODERICK.